(12) United States Patent
Duan et al.

(10) Patent No.: US 8,270,175 B2
(45) Date of Patent: Sep. 18, 2012

(54) CHIP CARD HOLDER FOR PORTABLE ELECTRONIC DEVICE

(75) Inventors: Chao Duan, Shenzhen (CN); Chia-Hua Chen, Taipei (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 219 days.

(21) Appl. No.: 12/900,686

(22) Filed: Oct. 8, 2010

(65) Prior Publication Data
US 2011/0267787 A1    Nov. 3, 2011

(30) Foreign Application Priority Data
Apr. 28, 2010  (CN) .......................... 2010 1 0157962

(51) Int. Cl.
*H05K 1/14*    (2006.01)
(52) U.S. Cl. ......... 361/737; 361/752; 361/801; 361/802
(58) Field of Classification Search .................. 361/600, 361/679.01, 727, 737, 748, 752, 756, 784, 361/796, 801, 802, 814; 439/259, 260, 326, 439/331, 373, 630, 330; 455/575.1, 73, 558
See application file for complete search history.

(56) References Cited

U.S. PATENT DOCUMENTS

| 5,257,414 | A  | * | 10/1993 | Trahan et al. ................. 455/558 |
| 5,315,478 | A  | * | 5/1994  | Cadwell et al. .......... 361/679.32 |
| 6,392,879 | B1 | * | 5/2002  | Chien ...................... 361/679.33 |
| 6,947,767 | B2 | * | 9/2005  | Haga et al. ..................... 455/558 |
| 7,255,605 | B2 | * | 8/2007  | Chen et al. .................... 439/630 |
| 7,794,232 | B2 | * | 9/2010  | Ogatsu ........................... 439/64 |
| 2003/0195020 | A1 | * | 10/2003 | Kubo ......................... 455/575.1 |
| 2007/0037431 | A1 | * | 2/2007  | Feng et al. .................... 439/328 |
| 2007/0149059 | A1 | * | 6/2007  | Zuo et al. ..................... 439/630 |

* cited by examiner

*Primary Examiner* — Hung S Bui
(74) *Attorney, Agent, or Firm* — Altis Law Group, Inc.

(57) ABSTRACT

A chip card holder for holding a chip card includes a fixing member and a sliding member. The fixing member defines a receiving space to receive the chip card. The fixing member includes two latching portions at two opposite sides thereof. Each latching portion includes a bent plate and a supporting plate. The bent plate defines a slot. The supporting plate is positioned above the receiving space. The sliding member includes a main plate and an operating portion at one end of the main plate. Two sliding blocks are formed on two sides of the main plate correspondingly. Each sliding block is slidably engaged in a corresponding slot. The supporting plates support the main plate.

19 Claims, 4 Drawing Sheets

CHIP CARD HOLDER FOR PORTABLE ELECTRONIC DEVICE

BACKGROUND

Technical Field

The present disclosure relates to chip card holders, particularly, to a chip card holder which is used in a portable electronic device.

Potable electronic devices generally include chip card holders to hold chip cards. Most chip card holders are positioned under batteries of the electronic devices. However, this increases the thickness of the electric device. In addition, since the battery is often replaced, the chip card can easily experience wear and tear. Therefore, sliding drawer card holders have been implemented.

A conventional sliding drawer card holder includes a fixing member and a sliding member. The fixing member includes two metal plates at two opposite sides correspondingly. Each metal plate defines a slot. Two guiding blocks are respectively formed at two opposite sides of the sliding member to engage with the slots. However, the metal plates are generally thin, and the engagement between the guiding block and the slot is not always stable.

Therefore, there is room for improvement within the art.

BRIEF DESCRIPTION OF THE DRAWINGS

Many aspects of the chip card holder can be better understood with reference to the following drawings. The components in the drawings are not necessarily drawn to scale, the emphasis instead being placed upon clearly illustrating the principles of the chip card holder.

DETAILED DESCRIPTION

Figure 1:
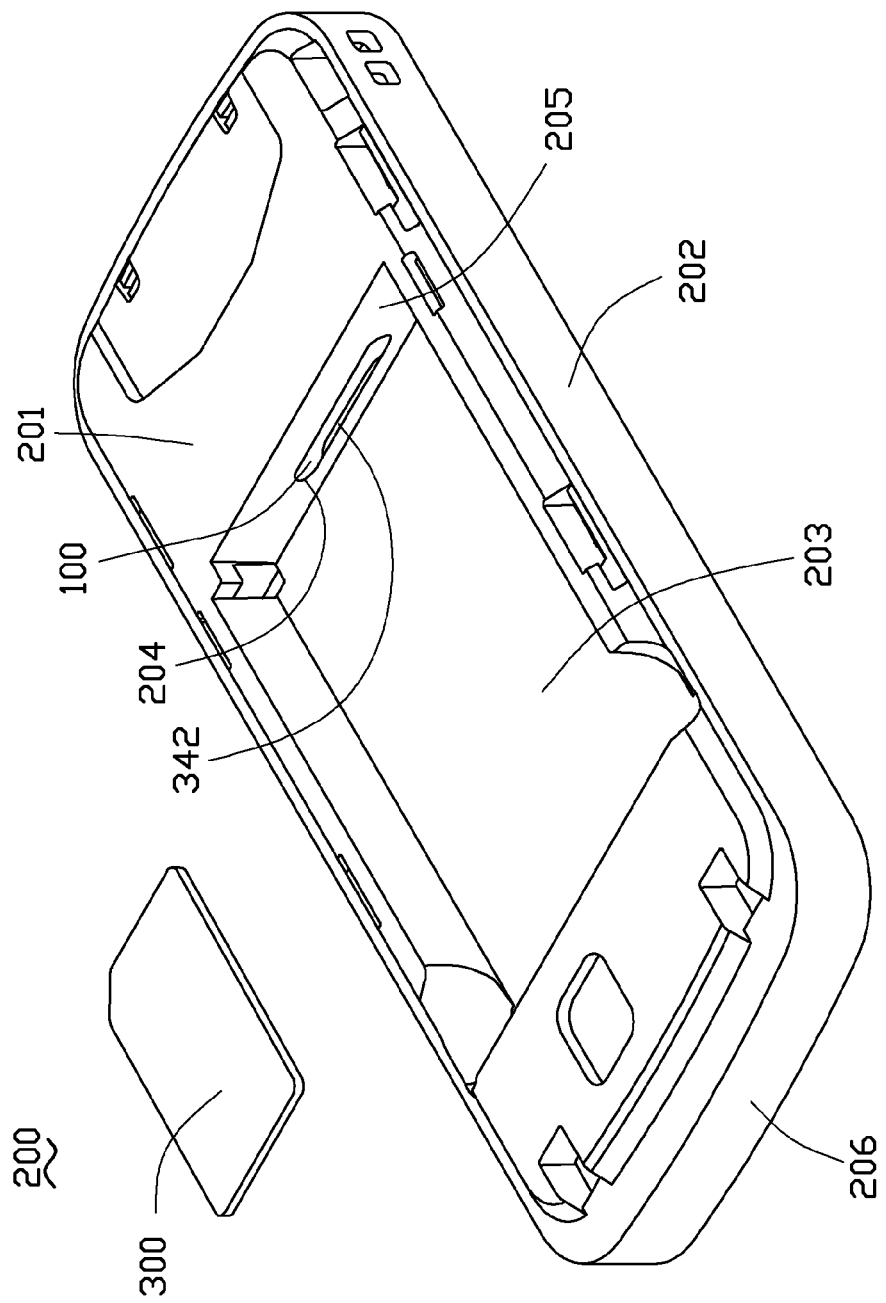
FIG. 1 is an isometric view of a portable electronic device with a chip card, in accordance with an exemplary embodiment.

FIG. 1 shows an exemplary embodiment of a portable electronic device 200 with a chip card holder 100 for holding a chip card 300. The electronic device 200 includes a housing 202 with a top surface 201 and a peripheral wall 206. The housing 202 defines a battery chamber 203 in the top surface 201 and includes a sidewall 205 beside the battery chamber 203. A cavity 204 is defined in the sidewall 205 communicating with the battery chamber 203.

Figure 2:
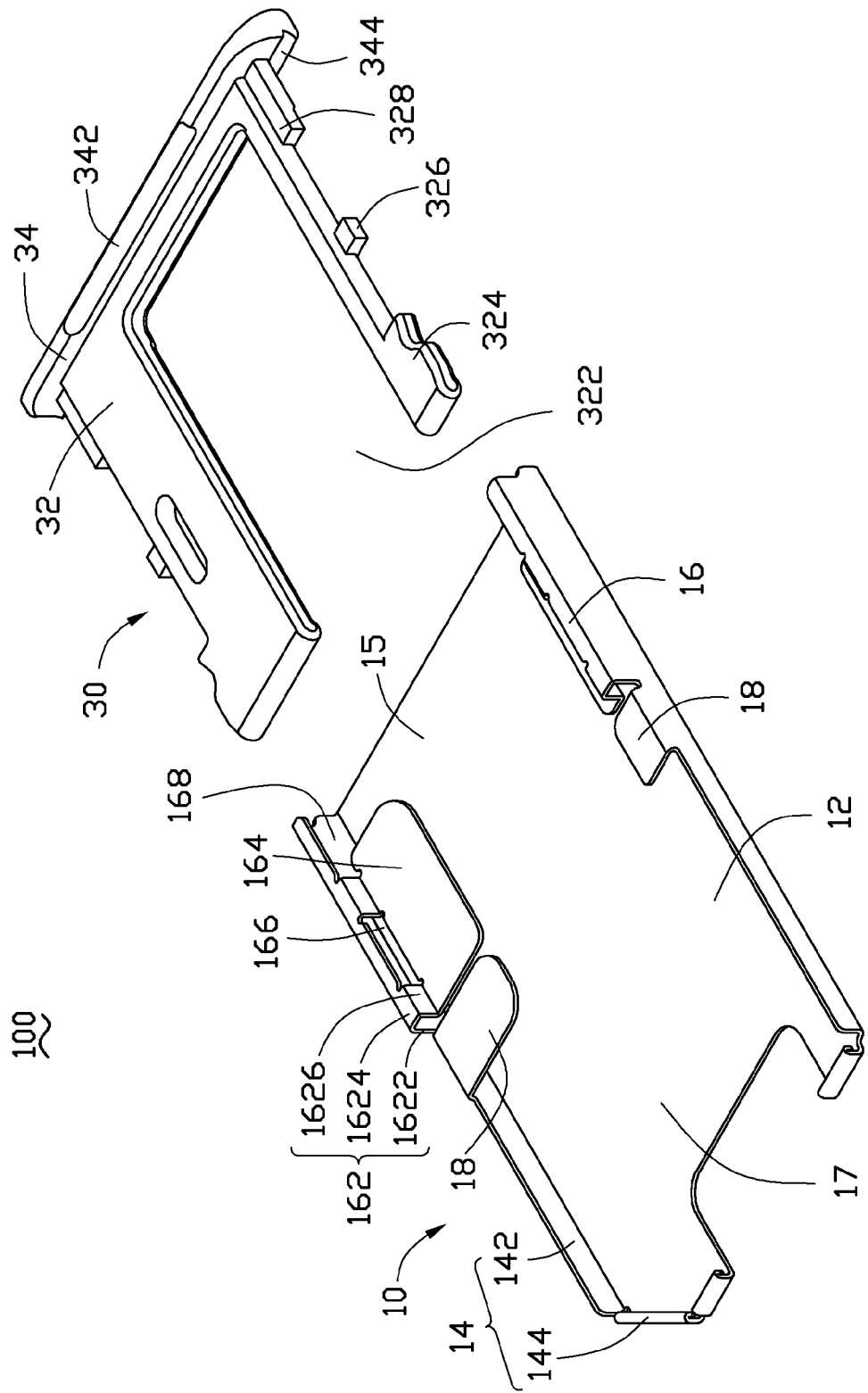
FIG. 2 is a partial exploded, isometric view of a chip card holder of the portable electronic device shown in FIG. 1.

Referring to FIG. 2, the chip card holder 100 includes a fixing member 10 and a sliding member 30. The fixing member 10 includes a bottom plate 12, a plurality of flanges 14 and two latching portions 16. The flanges 14 and the latching portions 16 are positioned at edges of the bottom plate 12. The flanges 14 and the bottom plate 12 cooperatively define a receiving space 17 for receiving the chip card 300. The flanges 14 include two side plates 142 and an end portion 144. In this exemplary embodiment, the end portion 144 is divided into a plurality of parts and bent into a seam.

The two latching portions 16 are positioned at one end of the bottom plate 12 away from the end portion 144. Each latching portion 16 includes a bent plate 162 and a supporting plate 164. Each bent plate 162 extends from a corresponding side plate 142, and includes an extending portion 1622, a connecting portion 1624 and a guiding portion 1626 connected to each other in order. A cross section of the bent plate 162 is substantially "⊓" shaped. Each guiding portion 1626 defines a slot 166. The supporting plate 164 perpendicularly extends from the guiding portion 1626 and is parallel to the bottom plate 12. A cantilever plate 18 is positioned adjacent to each latching portion 16 to stabilize the sliding member 30. The supporting plates 164 and the cantilever plates 18 are configured for supporting the sliding member 30. The receiving space 17 is between the supporting plates 164 and the bottom plate 12. The guiding portion 1626 and the supporting plate 164 are shorter than the connecting portion 1624. Thus, an open space 168 is defined under each connecting portion 1624.

The sliding member 30 includes a main plate 32 and an operating portion 34 at one end of the main plate 32. The main plate 32 defines an opening 322 allowing the chip card 300 to contact a connector (not shown). A protrusion 324, a sliding block 326 and a guiding block 328 are positioned apart from each other at each side of the main plate 32. The protrusion 324 and the guiding block 328 are positioned at two ends of the main plate 32, and the guiding block 328 is positioned adjacent to the operating portion 34. The sliding blocks 326 are for respectively being engaged in the slot 166 of the fixing member 10. The guiding blocks 328 are respectively configured for being engaged in the open spaces 168. A notch 342 is defined at one side of the operating portion 34. A gap 344 is defined at another side of the operating portion 34 for receiving one end of the chip card 300.

Figure 3:
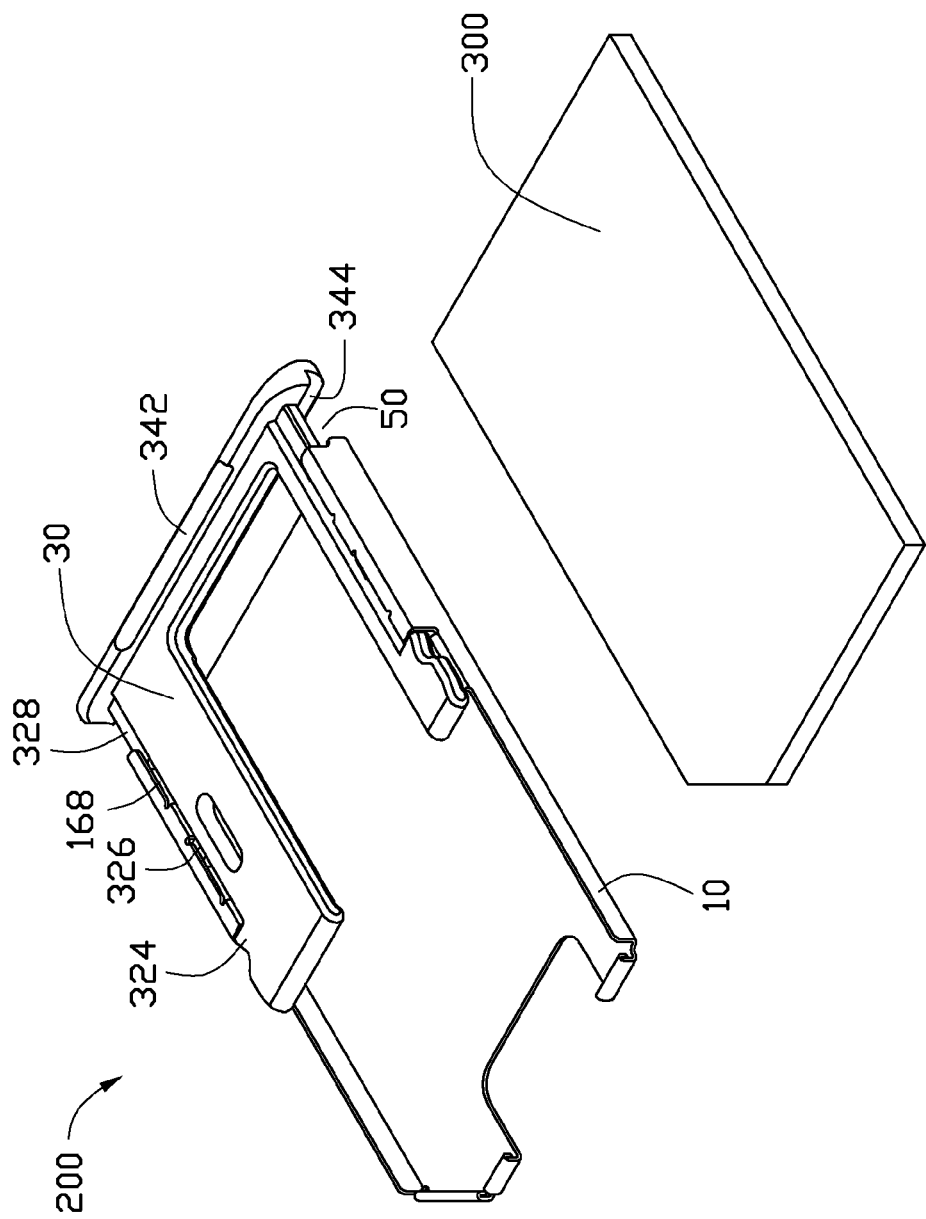
FIG. 3 is an assembled, isometric view of the chip card holder without the chip card, shown in FIG. 1.

Referring to FIG. 3, the sliding member 30 is attached to the fixing member 10. The sliding member 30 is slidable relative to the fixing member 10 by engagement between the sliding blocks 326 and the slots 166. Each guiding block 328 abuts a corresponding extending portion 1622. The main plate 32 is supported by the supporting plates 164 and the cantilever plates 18.

Figure 4:
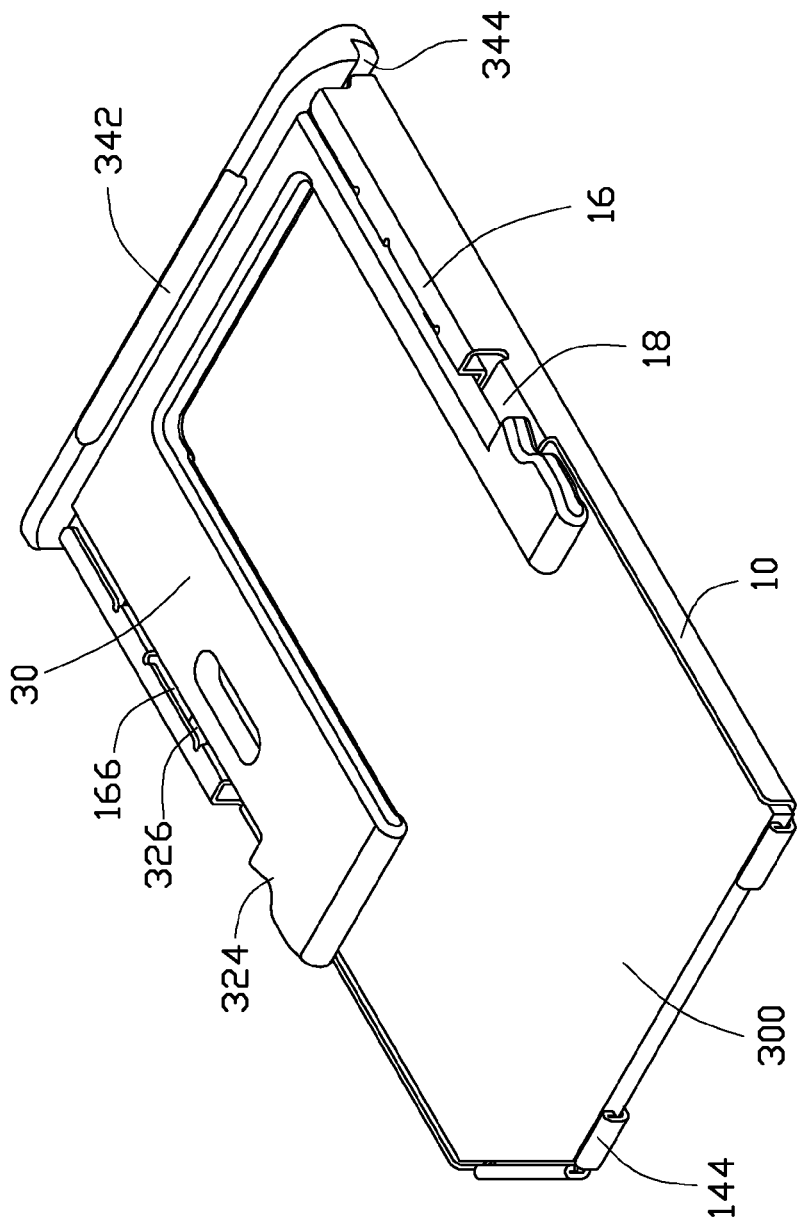
FIG. 4 is similar to FIG. 3, but showing the chip card received in the chip card holder.

Also referring to FIG. 4, to attach the chip card 300 to the holder 100, the sliding member 30 is moved out by the notch 342. The operating portion 34 and the fixing member 10 have a clearance 50 therebetween. One end of the chip card 300 is inserted into the receiving space 17 by the clearance 50, and the other end of the chip card 300 is received in the gap 344 and abuts the operating portion 34. The sliding member 30 is pushed toward the end portion 144 by the operating portion 34 until the chip card 300 is completely received in the receiving space 17.

To detach the chip card 300 from the holder 100, the sliding member 30 is moved out and the chip card 300 is moved away from the holder 100 by the clearance 50.

It is to be understood that the cavity 204 may be defined in the periphery wall 206 of the portable electronic device 200.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A chip card holder for holding a chip card, comprising:
a fixing member defining a receiving space to receive the chip card, the fixing member including two latching portions at two opposite sides thereof, each latching portion including a bent plate and a supporting plate, the bent plate defining a slot, the supporting plate positioned above the receiving space; and a sliding member including a main plate and an operating portion at one end of the main plate, each of the two sliding blocks formed on each of the two sides of the main plate, each sliding block slidably engaged in a corresponding slot, the supporting plates supporting the main plate.

2. The chip card holder as claimed in claim 1, wherein the bent plate is substantially "冂" shaped.

3. The chip card holder as claimed in claim 2, wherein the bent plate comprises an extending portion, a connecting portion and a guiding portion, the slot is defined in the guiding portion, and each supporting plate extends from a corresponding guiding portion.

4. The chip card holder as claimed in claim 3, wherein the operating portion defines a notch at one side thereof.

5. The chip card holder as claimed in claim 4, wherein the operating portion defines a gap at another side for receiving one end of the chip card.

6. The chip card holder as claimed in claim 3, wherein two protrusions are formed at one end of the main plate for preventing the sliding member from separating from the fixing member.

7. The chip card holder as claimed in claim 4, wherein a guiding block is formed at each side of the main plate, and each guiding block abuts a corresponding extending portion.

8. The chip card holder as claimed in claim 1, wherein a cantilever plate is positioned adjacent to each latching portion, and the cantilever plates are at a same level as the supporting plates.

9. The chip card holder as claimed in claim 1, wherein the sliding member further comprises a bottom plate, two side plates are formed at two side of the bottom plate correspondingly, an end portion is formed at one end of the bottom plate, and the receiving space is defined by the bottom plate, the side plates and the end portion.

10. The chip card holder as claimed in claim 9, wherein each extending portion extends from a corresponding side plate.

11. A portable electronic device, comprising
A housing defining a cavity communicating to outside;
a chip card holder including:

a fixing member fixed in the cavity, the fixing member defining a receiving space, the fixing member including two latching portions at two opposite sides thereof, each latching portion including a bent plate and a supporting plate, the bent plate defining a slot, the supporting plate positioned above the receiving space; and a sliding member including a main plate, two sliding blocks and an operating portion, the sliding member being slidably relative to the fixing member by engagement between the sliding blocks and the slots, the supporting plates supporting the main plate.

12. The portable electronic device as claimed in claim 11, wherein the bent plate is "冂" shaped.

13. The portable electronic device as claimed in claim 12, wherein the bent plate comprises an extending portion, a connecting portion and a guiding portion, the slot is defined in the guiding portion, and each supporting plate extends from a corresponding guiding portion.

14. The portable electronic device as claimed in claim 13, wherein the operating portion defines a notch at one side thereof.

15. The portable electronic device as claimed in claim 14, wherein the operating portion defines a gap at another side for receiving one end of the chip card.

16. The portable electronic device as claimed in claim 13, wherein two protrusions are formed at one end of the main plate for prevent the sliding member from separating from the fixing member.

17. The portable electronic device as claimed in claim 14, wherein a guiding block is formed at each side of the main plate, and each guiding block abuts a corresponding extending portion.

18. The portable electronic device as claimed in claim 11, wherein a cantilever plate is positioned adjacent to each latching portion, and the cantilever plates are at a same level as the supporting plates.

19. The portable electronic device as claimed in claim 11, wherein the sliding member further comprises a bottom plate, two side plates are formed at two side of the bottom plate correspondingly, an end portion is formed at one end of the bottom plate, and the receiving space is defined by the bottom plate, the side plates and the end portion.

* * * * *